United States Patent [19]
Metzke

[11] 3,881,769
[45] May 6, 1975

[54] MEANS FOR SECURING INSULATION TO A VEHICLE ENCLOSURE

[75] Inventor: William R. Metzke, Springfield, Ill.

[73] Assignee: Fiat-Allis Construction Machinery, Inc., Deerfield, Ill.

[22] Filed: Sept. 6, 1973

[21] Appl. No.: 394,916

[52] U.S. Cl.............. 296/39 A; 52/404; 296/28 C
[51] Int. Cl............................................ B62d 33/00
[58] Field of Search....... 296/28 C, 35, 39 R, 39 A, 296/137 A; 52/404, 406, 407, 144, 145

[56] References Cited
UNITED STATES PATENTS
| | | | |
|---|---|---|---|
| 1,736,856 | 11/1929 | Lohrman | 296/137 A |
| 2,110,488 | 3/1938 | Justement | 52/144 |
| 3,433,526 | 3/1969 | Field et al. | 296/137 A |

FOREIGN PATENTS OR APPLICATIONS
| | | | |
|---|---|---|---|
| 865,977 | 4/1961 | United Kingdom | 296/137 A |
| 13,217 | 4/1925 | Netherlands | 52/404 |

*Primary Examiner*—Robert J. Spar
*Assistant Examiner*—Donald W. Underwood
*Attorney, Agent, or Firm*—Kirby & Nilles

[57] ABSTRACT

Lugs are formed on a wall part of a side panel of a vehicle enclosure and extend inwardly toward a frame member so that when insulation is pushed between the frame member and the lugs, the lugs will hold the insulation in place. The lugs are formed at the extreme upper end of the wall part of the panel by a simple stamping operation. A rain gutter corner part is disposed in overlapping relation to the upper end of the wall part and is secured thereto by welding.

7 Claims, 4 Drawing Figures

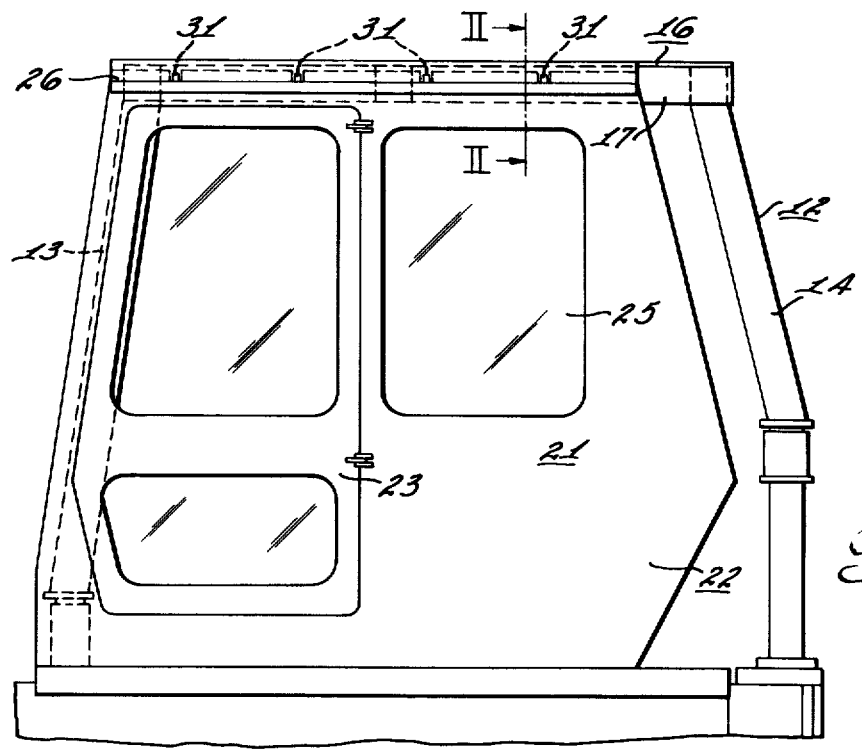
Fig.-1
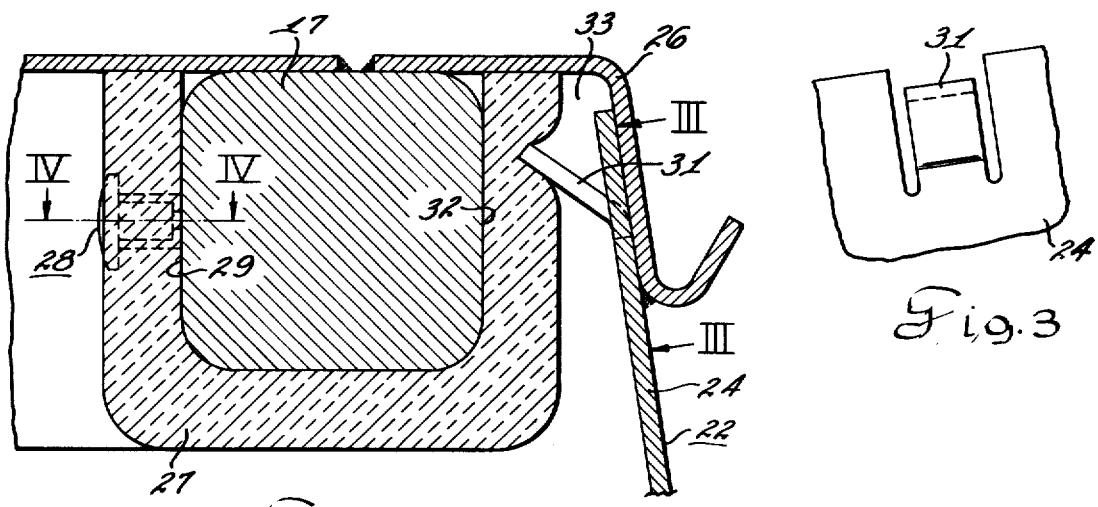
Fig.2
Fig.3
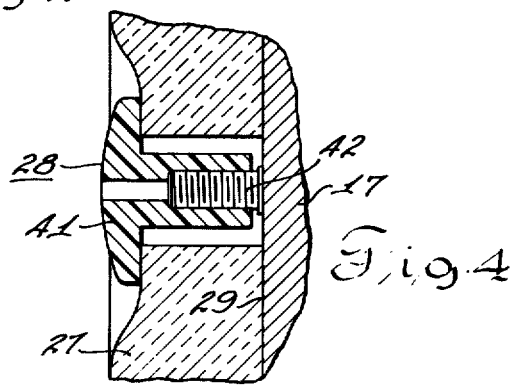
Fig.4

MEANS FOR SECURING INSULATION TO A VEHICLE ENCLOSURE

BACKGROUND OF THE INVENTION

A number of arrangements have been employed in securing insulation to various parts of the vehicle body. One common method is to use adhesive. However, adhesives tend to be objectionable from a disassembly and replacement standpoint and tend to be messy to handle, particularly when applying insulation to an overhead area. Another method of attaching insulation to a vehicle enclosure is that of using clips, screws or other types of fasteners, usually of the speed type. Such fasteners require working space for installation and may not be entirely suitable in a confined area.

BRIEF DESCRIPTION OF THE INVENTION

In a confined area of a vehicle enclosure, the insulation for a frame member is held in place by lugs projecting from a juxtaposed panel member.

BRIEF DESCRIPTION OF THE DRAWINGS

FIG. 1 is a side view of a vehicle enclosure incorporating a rollover protection structure;

FIG. 2 is a section view taken along the line II—II in FIG. 1;

FIG. 3 is a section view taken along the line III—III in FIG. 2; and

FIG. 4 is a section view taken along the line IV—IV in FIG. 2.

DETAILED DESCRIPTION OF THE INVENTION

Referring to FIG. 1 the enclosure for the vehicle includes a rollover protection frame 12 comprising a plurality of legs 13 and 14 extending downwardly from a horizontally disposed rectangular overhead frame structure 16 including a side frame member 17. A cab 21 is formed by panels secured to the frame 12 including a side panel 22 having a hinged door 23 and a window 25. As shown in FIG. 2, a wall part 24 of the panel 22 is welded near its upper end to a curved rain gutter corner part 26 which in turn is welded to the frame member 17. The elongated longitudinally extending frame member 17 is isulated by a pliable insulation member 27 which in its uninstalled condition is of uniform thickness. The insulation member 27 is secured by a speed fastener 28 to the inside surface 29 of frame member 17 and is wrapped around the frame member 17 as illustrated in FIG. 2. It will be noted that the upper portion of the wall part 24 is parallel to the frame member 17 and presents a plurality of longitudinally spaced tabs or lugs 31 which are formed as by stamping the extremity of wall part 24 to achieve the configuration illustrated in FIGS. 2 and 3. When the insulation 27 is pushed into the pocket 33 between frame member 17 and the juxtaposed wall part 24, the lugs 31, extending at an angle into the closed end of the pocket 33, hold the insulation in place by compressing the latter to a reduced thickness.

From the drawings and foregoing description it is apparent that a novel means has been provided for securing insulation in place in a confined area of the vehicle enclosure. The lugs 31 releasably hold the insulation in place, and thus, the insulation may be removed, if it is damaged or the enclosure requires repairs, by screwing the nut 41 of fastener 28 off the stud 42 secured to the frame member 17 and then pulling the insulation downwardly from its confined position between the lugs 31 and the frame member 17. Inasmuch as the rain gutter part 26 is in overlapping relation to the upper portion of the wall part 24 in which the lugs 31 are formed, the gutter part hides and protects that end of the panel thereby providing satisfactory construction and appearance.

The embodiments of the invention in which an exclusive property or privilege is claimed are defined as follows:

1. In a vehicle enclosure of the type having a frame to which panels are secured, the combination comprising:

an elongated frame member comprising a first surface, a panel defining a side of said enclosure and having a portion in juxtaposed relation to but spaced from said first surface of said frame member, said portion of said panel including a plurality of spaced apart lugs projecting in the direction of and at an angle to said first surface of said frame member, and a pliable insulation member having an edge portion disposed between said first surface of said frame member and said lugs, the insulation member being compressed to a reduced thickness in the area of contact with said lugs whereby said insulation member is releasably held in place.

2. The enclosure of claim 1 wherein said panel is secured to said frame member in such a manner as to define a pocket between said first surface of said frame member and said portion of said panel and wherein said lugs extend at an angle into said pocket.

3. The enclosure of claim 2 wherein said panel includes a wall part with an edge in generally parallel disposition relative to the adjacent first surface of said frame member, wherein said lugs are formed in said edge and extend inwardly into said pocket and wherein said panel includes a curved corner part connected to said frame member and in outwardly overlapping relation to and connected to said portion of said wall part in which said lugs are formed.

4. The enclosure of claim 3 wherein said corner part comprises a rain gutter defined by a curved portion of said curved corner part which is in outwardly overlapping relation to said wall part of said panel.

5. In a vehicle enclosure of the type having a frame to which panels are secured, the combination comprising:

an elongated frame member near a corner of said enclosure, said frame member comprising a first surface, a panel defining a side of said enclosure and comprising a curved corner part connected to said frame member to define a pocket and a wall part connected to said corner part in inwardly overlapping relation, said wall part having a portion along one edge thereof which is in juxtaposed relation to but spaced from said first surface of said frame member, said portion of said panel including a plurality of spaced apart lugs integrally formed in said edge and projecting in the direction of and at an angle to said first surface of said frame member and into said pocket, and a pliable insulation member having an edge portion disposed between said first surface of said frame member and said lugs, the insulation member being compressed to a reduced thickness in the area of contact with said lugs whereby said insulation member is releasably held in place.

6. The enclosure of claim 4 wherein said corner part comprises a rain gutter defined by a curved portion of said curved corner part which is in outwardly overlapping relation to said wall part of said panel.

7. The enclosure of claim 5 wherein said elongated frame member comprises a second surface opposite said first surface, wherein said insulation member extends around said elongated frame member from said first surface to said second surface, and including means for releasably securing said insulation member to said second surface of said elongated frame member.

* * * * *